No. 633,620. Patented Sept. 26, 1899.
E. M. SMITH.
TOOL HOLDING DEVICE.
(Application filed Aug. 28, 1898.)
(No Model.)
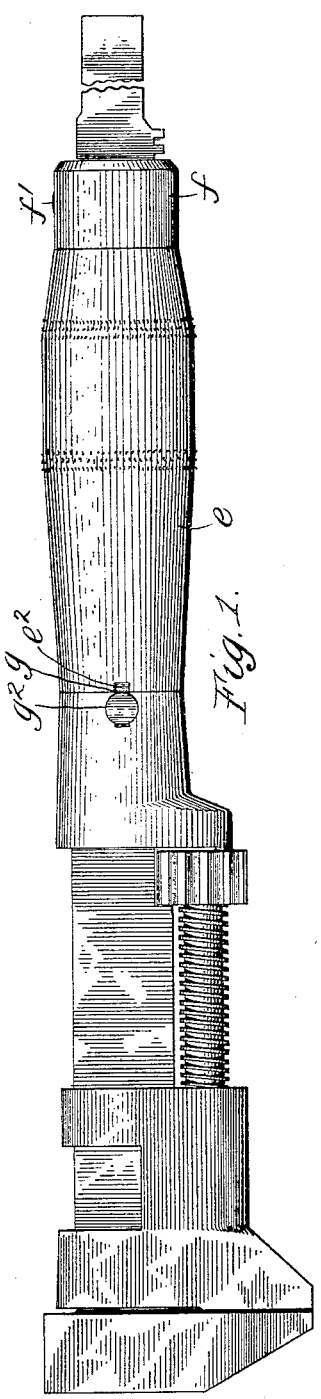
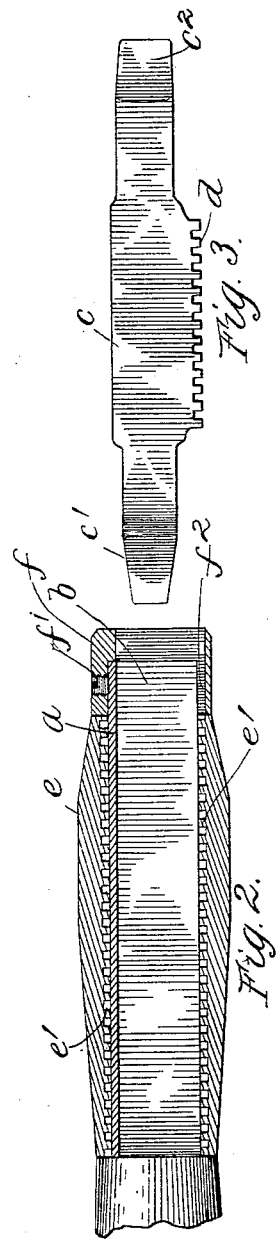
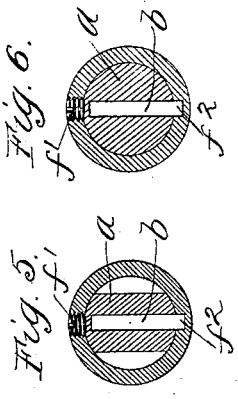
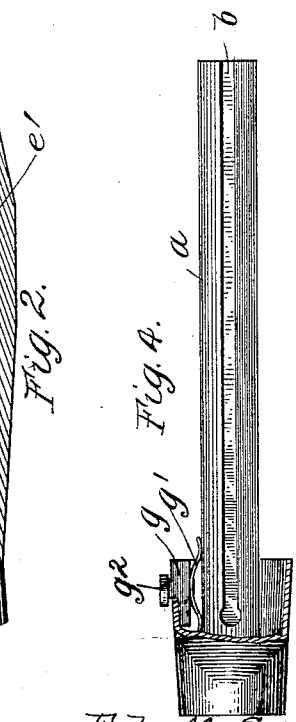
Witnesses:
Inventor:
Ed M. Smith
By Barton & Brown
Attorneys.

UNITED STATES PATENT OFFICE.

ED M. SMITH, OF CHICAGO, ILLINOIS, ASSIGNOR OF ONE-HALF TO ALBERT E. RICHARDSON, OF SAME PLACE.

TOOL-HOLDING DEVICE.

SPECIFICATION forming part of Letters Patent No. 633,620, dated September 26, 1899.

Application filed August 28, 1896. Serial No. 604,176. (No model.)

*To all whom it may concern:*

Be it known that I, ED M. SMITH, a citizen of the United States, residing at Chicago, in the county of Cook and State of Illinois, have invented a certain new and useful Improvement in Tool-Holding Devices, of which the following is a full, clear, concise, and exact description, reference being had to the accompanying drawings, forming a part of this specification.

My invention relates to an improved tool-holding device, the object thereof being to provide a compact, strong, and practical holder adapted to meet the requirements of every-day use.

The device of the present application is particularly well adapted for repair-work outside the shop, and accordingly I have illustrated my improvements in connection with a "kit-wrench" of my design, which will be found extremely convenient for that class of work.

The tool-holder of my invention may be described in brief as consisting of a grooved slide within which the shank of the tool closely fits and a rotatable threaded part engaging the said shank by which the tool is removably though firmly held in position, the rotation of said part preferably causing the withdrawal or extension of said tool, as desired.

I will describe my invention more particularly by reference to the accompanying drawings, in which—

Figure 1 is a side view of the kit-wrench above mentioned. Fig. 2 is a longitudinal sectional view of the tool-holding portion thereof. Fig. 3 illustrates a reversible screw-driver adapted to be inserted in said device. Fig. 4 shows the tool-holding device, partly in section, with the threaded handle portion or casing removed therefrom. Fig. 5 is a sectional view on line 5 5, Fig. 1. Fig. 6 is a similar view showing a slightly-modified construction.

Throughout each of the several figures like parts are designated by the same letters of reference.

The wrench portion of the device shown is of the usual construction, with the exception that the extension or shank $a$ is lengthened and the central portion thereof tooled out to provide a slide or groove $b$, in which the tool $c$ closely fits. Upon one side of the tool is cut the rack $d$, the full width of said rack extending above the walls of part $a$ when the tool is inserted therein. The handle or casing $e$ is rotatable, upon the interior of which is provided the threaded portion $e'$, adapted to engage the rack $d$ when the tool or shank thereof is inserted in the slide. The cap $f$ is secured at the end of the device by a screw $f'$, and an opening $f^2$, registering with the groove $b$, is provided in the said cap, through which the portion of the tool bearing the rack $d$ is adapted to pass.

In the end of the casing $e$ abutting the wrench is provided the notch $e^2$, which is adapted to be engaged by the catch $g$, and thus hold the said casing rigid and prevent it from turning. A spring $g'$ serves to hold the catch in position, and a button $g^2$, extending slightly above the surrounding surface of the wrench, renders the catch easily inserted within or withdrawn from the said notch. By the rotation of the casing or handle portion $e$ the reversible screw-driver $c$ or any other tool desired of similar construction may be entirely withdrawn into the slide or extended through the opening $f^2$ at pleasure. Upon continuing the rotation until the rack is disengaged by the threaded portion the tool may be removed and another inserted. With the reversible screw-driver $c$ shown either one of the ends $c'$ or $c^2$ may be employed.

When the tool or the shank thereof rests within the slide or groove $b$, the walls thereof closely engage the same, preventing any lateral play, while the rack is engaged by the interior thread provided upon $e$, which restrains any longitudinal movement thereof with reference to the handle. It will be seen from the above that with this construction the tool is held as firmly and rigidly in position as though it were permanently mounted, since the catch $g$ when extended prevents the casing from rotating.

If desired, the walls of the shank $a$ may be constructed to engage the tops of threads $e'$, provided upon the interior of casing $e$, as illustrated in Fig. 6, thus better adapting it to resist a twisting strain applied to the tool.

It will be seen that such engagement practically throughout the entire exterior surface of the shank affords a somewhat greater support for the tool maintained within its slide when subjected to a torsion or twisting strain than the construction shown in Figs. 4 and 5. This latter construction, however, wherein the curved edges of the shank or extension engage corresponding surfaces of the interior thread, provides a sufficiently strong construction to withstand strains encountered during the ordinary use of the tool.

A workman provided with my kit-wrench above described and a few tools adapted to be inserted therein, all of which would be compact and of light weight, would be prepared for a wide range of work. The device shown also has numerous advantages for use as a shop-tool.

Having now described my invention, what I claim as new, and desire to secure by Letters Patent, is—

1. In a tool-holding device, the combination with a shank or extension, of a grooved slide cut in one side of said extension, a tool fitting within the said slide and closely engaged by the walls thereof, whereby the lateral movement of said tool is prevented and torsional strains are resisted, a rack provided upon said tool extending without the slide, and a rotatable casing provided with a threaded portion adapted to engage the rack and effect the longitudinal movement of the tool within the slide upon the rotation of said casing, substantially as described.

2. The combination in a tool-holding device, with a rotatable casing provided with an interior square-faced thread, of an extension or shank disposed within said casing, a groove or slide cut in one side thereof, the curved lateral edges of said extension being maintained in engagement with the projecting faces of the thread whereby the extension or shank is strengthened to resist torsional strain, a tool provided with a rack extending beyond the slide and adapted to engage said thread, the tool fitting closely within the slide and having a longitudinal movement therein, and means for locking the casing against rotation, substantially as described.

3. In a tool-holding device, the combination with a rotatable casing $e$ provided with an interior thread $e'$, of a shank or extension $a$ disposed within said casing, the exterior walls of which engage the projecting faces of the thread, whereby said shank is strengthened to resist torsional strain, a groove or slide $b$ cut in one side of said shank and a tool provided with a rack $d$ closely fitting said slide and restrained thereby from lateral movement, the said rack engaging the thread $e'$ whereby upon the rotation of the casing longitudinal movement is imparted to said tool, substantially as described.

4. In a device of the class described, the combination with a shank or extension having a grooved slide cut in one side thereof, of a screw-driver or similar tool fitting within said slide and closely engaged by the walls thereof, a rack provided upon said tool extending beyond the edges of the slide, a rotatable casing provided with an interior threaded portion adapted to engage the rack and effect the longitudinal movement of the tool within the slide upon the rotation of said casing, the lateral edges of the shank being curved and engaging the surfaces of the interior threads, whereby the device is better adapted to resist torsional strain, and means for locking the casing against rotation, substantially as described.

In witness whereof I hereunto subscribe my name this 25th day of August, A. D. 1896.

ED M. SMITH.

Witnesses:
 A. L. LAWRENCE,
 GEORGE L. CRAGG.